(12) United States Patent
Strong

(10) Patent No.: X6683
(45) Date of Patent: Aug. 2, 1831

(54) LOCK, PERCUSSION, SIDE, FOR RIFLES

(76) Inventor: Elisha Strong

Elisha Strong. A Citizen of

Letters Patent.

The Schedule referred to in these Letters Patent and
making part of the same, containing a description in the words of
the said Elisha Strong, himself of his improvement in making
Rifle Locks, called the Percussion Side Lock.

To all to whom these presents shall come;
Be it known that I, Elisha Strong of Claridon, in the County of
Geauga, & State of Ohio, have invented a new and useful improve
-ment in making locks, & that the following is a full & exact
description of said lock, called the Percussion Side Lock for
caps or kernels, made use of for Rifles, Pistols, & all kinds of fire arms.
The plate is shaped like a flint lock, except the pan with a mortice
through the hind part lengthways of the plate, long enough to contain the
cock, dog & dog spring. The cock is a little bent in the middle, & the
fore part turned up & made flat to place the thumb against, so
as to cock the same, and the hind part wide enough to pass through
the mortice, so that the main spring may rest upon it back of the
pin. The main spring is straight, put on with a screw on the fore
part of the plate on the inside, with a pin in the end to keep it in
its place. The dog is almost straight, but large enough at the end
outside of the plate to receive a [illegible] notch to hold the cock when cocked,
the cock notch will be on the cock outside of the plate, and a set
screw in the same. The dog screw is screwed on back of the [illegible] mortice
the fore part passing thro' the mortice by bending so that the
small end will press against the dog above the pin; there
must be a screw or pin through the cock and dog in the [illegible]
of the plate;— there may be a half cock notch if desired & also
a roll in the cock for the main spring likewise. The punch
or exploding pin must be inserted in the fore end of the cock high high enough to clear the plate, for caps there must be a screw or pin in the end large enough next the barrel to receive a a hole sufficient to cover the cap the cylinders in the barrel are made for each in the usual way.

Witnesses — Claridon Mag 5th 1861

Asa Bowles — Elisha Strong

Wm Strong (317 Words)